US012585635B2

(12) United States Patent
Witham et al.

(10) Patent No.: US 12,585,635 B2
(45) Date of Patent: Mar. 24, 2026

(54) IMPLEMENTING MESSAGE ACCESS FOR UNCOMMITTED TRANSACTION MESSAGES

(71) Applicant: INTERNATIONAL BUSINESS MACHINES CORPORATION, Armonk, NY (US)

(72) Inventors: Oliver Witham, Kingsclere (GB); Douglas Eric Burns, Didcot (GB); James Oliver Hurst, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 114 days.

(21) Appl. No.: 18/608,988

(22) Filed: Mar. 19, 2024

(65) Prior Publication Data

US 2025/0258810 A1 Aug. 14, 2025

(30) Foreign Application Priority Data

Feb. 13, 2024 (GB) ...................................... 2401969

(51) Int. Cl.
*G06F 16/23* (2019.01)

(52) U.S. Cl.
CPC ................................ *G06F 16/2379* (2019.01)

(58) Field of Classification Search
CPC .............................. G06F 16/2379; G06F 9/466
See application file for complete search history.

(56) References Cited

U.S. PATENT DOCUMENTS

| | | | | |
|---|---|---|---|---|
| 6,154,847 | A | * 11/2000 | Schofield | ............ G06F 11/1474 714/21 |
| 7,930,274 | B2 | 4/2011 | Hwang | |
| 8,223,785 | B2 * | 7/2012 | Herrmann | ............... H04W 4/00 370/412 |

(Continued)

FOREIGN PATENT DOCUMENTS

| | | |
|---|---|---|
| CN | 115576714 B | 5/2023 |
| GB | 2638157 A | 8/2025 |

OTHER PUBLICATIONS

Cook et al., "Read-Uncommitted Transactions for Smart Contract Performance," 2019 IEEE 39th International Conference on Distributed Computing Systems (ICDCS), Oct. 31, 2019, https://ieeexplore.ieee.org/abstract/document/8884987/authors#authors, pp. 1960-1970.

(Continued)

*Primary Examiner* — Merilyn P Nguyen
(74) *Attorney, Agent, or Firm* — Kristofer Haggerty

(57) ABSTRACT

A method, computer program product, and computer system are provided for implementing message access for uncommitted transaction messages. The method includes: receiving a put operation of a message as part of a first transaction; permitting a get operation of the put message before the put message is committed, wherein the get operation is part of a second transaction; linking the second transaction to the first transaction; and delaying resolution of the second transaction until the first transaction is resolved. Delaying resolution of the second transaction may include receiving a check operation for the second transaction that all uncommitted put operations are committed before the second transaction can commit and responding to the check operation when the first transaction resolves.

18 Claims, 7 Drawing Sheets

(56) References Cited

U.S. PATENT DOCUMENTS

| | | | | |
|---|---|---|---|---|
| 9,634,962 | B2 | 4/2017 | Harran | |
| 10,216,668 | B2 | 2/2019 | Wang | |
| 11,500,546 | B1 | 11/2022 | Varadarajan | |
| 2002/0059316 | A1* | 5/2002 | Kettley | G06F 11/1443 |
| 2007/0038569 | A1* | 2/2007 | Hickson | G06F 9/546 |
| | | | | 705/50 |
| 2012/0017037 | A1* | 1/2012 | Riddle | G06F 16/24569 |
| | | | | 711/E12.008 |
| 2015/0074070 | A1* | 3/2015 | Bortnikov | G06F 16/2308 |
| | | | | 707/703 |
| 2021/0073198 | A1* | 3/2021 | Srinivasan | G06F 11/1471 |

OTHER PUBLICATIONS

Witham et al., "Implementing Message Access for Uncommitted Transaction Messages", Application No. GB 2401969.7, Filing Date Feb. 13, 2024, 24 pages.

* cited by examiner

300

600

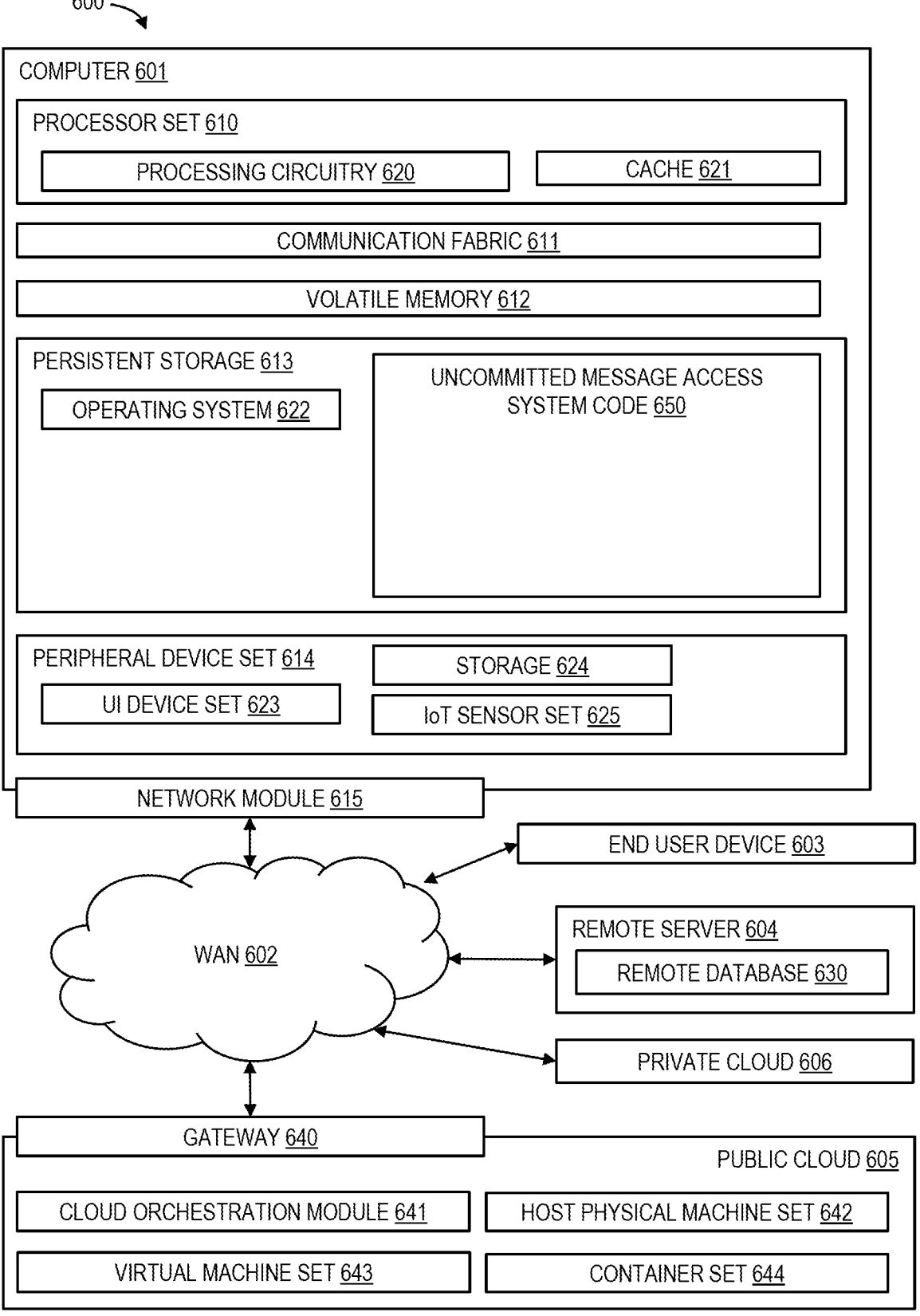

COMPUTER 601

PROCESSOR SET 610

PROCESSING CIRCUITRY 620     CACHE 621

COMMUNICATION FABRIC 611

VOLATILE MEMORY 612

PERSISTENT STORAGE 613

OPERATING SYSTEM 622

UNCOMMITTED MESSAGE ACCESS SYSTEM CODE 650

PERIPHERAL DEVICE SET 614

UI DEVICE SET 623

STORAGE 624

IoT SENSOR SET 625

NETWORK MODULE 615

WAN 602

END USER DEVICE 603

REMOTE SERVER 604

REMOTE DATABASE 630

PRIVATE CLOUD 606

GATEWAY 640

PUBLIC CLOUD 605

CLOUD ORCHESTRATION MODULE 641

HOST PHYSICAL MACHINE SET 642

VIRTUAL MACHINE SET 643

CONTAINER SET 644

*FIG. 6*

IMPLEMENTING MESSAGE ACCESS FOR UNCOMMITTED TRANSACTION MESSAGES

BACKGROUND

The present invention relates to transaction message handling between message producers and message consumers, and more specifically, to implementing message access for uncommitted transaction messages.

Message brokers route and deliver messages to their appropriate destinations. Message brokers serve as intermediaries between other applications, allowing senders to issue messages without knowing where the receivers are, whether or not they are active, or how many of them there are. This facilitates decoupling of processes and services within systems. In order to provide reliable message storage and guaranteed delivery, message brokers often rely on a message queue that stores and orders the messages until consuming applications can process them.

In message processing, a two-phase commit protocol may be used as a distributed algorithm that coordinates all the processes that participate in a distributed atomic transaction on whether to commit or abort (roll back) the transaction.

Bulk message transfer between a network of messaging brokers uses batching for efficiency. Each transactional step in a process has to wait until the previous step has completed a batch before starting its work. Therefore, the total time for a batch to progress through the whole process is the sum of elapsed time for each transactional step.

SUMMARY

According to an aspect of the present invention there is provided a computer-implemented method for implementing message access for uncommitted transaction messages, said method comprising: receiving a put operation of a message as part of a first transaction; permitting a get operation of the put message before the put message is committed, wherein the get operation is part of a second transaction; linking the second transaction to the first transaction; and delaying resolution of the second transaction until the first transaction is resolved.

The method has the advantage of removing the need for a second transaction to wait until the previous transaction step has completed before starting its work. This improves the total time of a process, particularly in the case of batch processing.

Delaying resolution of the second transaction may include receiving a check operation for the second transaction that all uncommitted put operations are committed before the second transaction can commit and responding to the check operation when the first transaction resolves.

This has the advantage of ensuring that the first transaction's operations are committed before committing the second transaction.

According to another aspect of the present invention there is provided a system for implementing message access for uncommitted transaction messages, comprising: a processor and a memory configured to provide computer program instructions to the processor to execute the function of the components of a transaction controller including: a first transaction put operation component for receiving a put operation of a message as part of a first transaction; an uncommitted get operation component for permitting a get operation of the put message before the put message is committed, wherein the get operation is part of a second transaction; a transaction linking component for linking the second transaction to the first transaction; and a second transaction delay component for delaying resolution of the second transaction until the first transaction is resolved.

According to a further aspect of the present invention there is provided a computer program product for implementing message access for uncommitted transaction messages, the computer program product comprising a computer readable storage medium having program instructions embodied therewith, the program instructions executable by a processor to cause the processor to: receive a put operation of a message as part of a first transaction; permit a get operation of the put message before the put message is committed, wherein the get operation is part of a second transaction; link the second transaction to the first transaction; and delay resolution of the second transaction until the first transaction is resolved.

The computer readable storage medium may be a non-transitory computer readable storage medium and the computer readable program code may be executable by a processing circuit.

BRIEF DESCRIPTION OF THE DRAWINGS

Embodiments of the present invention will now be described, by way of example only, with reference to the accompanying drawings:

FIG. 6 is a block diagram of an example embodiment of a computing environment for the execution of at least some of the computer code involved in performing the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

Embodiments of a method, system, and computer program product are provided for implementing message access for uncommitted transaction messages. A put operation of a message may be placed on a queue as part of a first transaction by a producer and the described method permits a get operation of the put message as part of a second transaction before the put message is committed in the first transaction. The method links the second transaction to the first transaction and delays resolution of the second transaction until the first transaction is resolved.

The implementing of message access for uncommitted transaction messages is an improvement in the technical field of computer transactions and, more particularly, in the technical field of efficient processing of transaction messages in a network of messaging brokers by improving the throughput of messages.

Message access to uncommitted transaction messages may be referred to as using "pre-emptive gets" in transactions, which allows access to messages from uncommitted puts. To ensure data integrity, a ready-check is performed before the getting application's transaction can commit which suspends until all uncommitted puts are committed. If any of the puts are rolled back, the getting batch transaction must roll back too.

The method facilitates synchronization of chained transactions by allowing access to uncommitted work and coordination of commit processing.

Doing a "pre-emptive get" of an uncommitted message means that the consuming application can start doing its post-get application logic processing as soon as the message has been put by the producer. Without a "pre-emptive get", the consuming application would have to wait until the producing application committed the message. In practice, a "pre-emptive get" allows for more simultaneous processing of application (e.g. non-messaging) logic between the producer and consumer.

Figure 1:
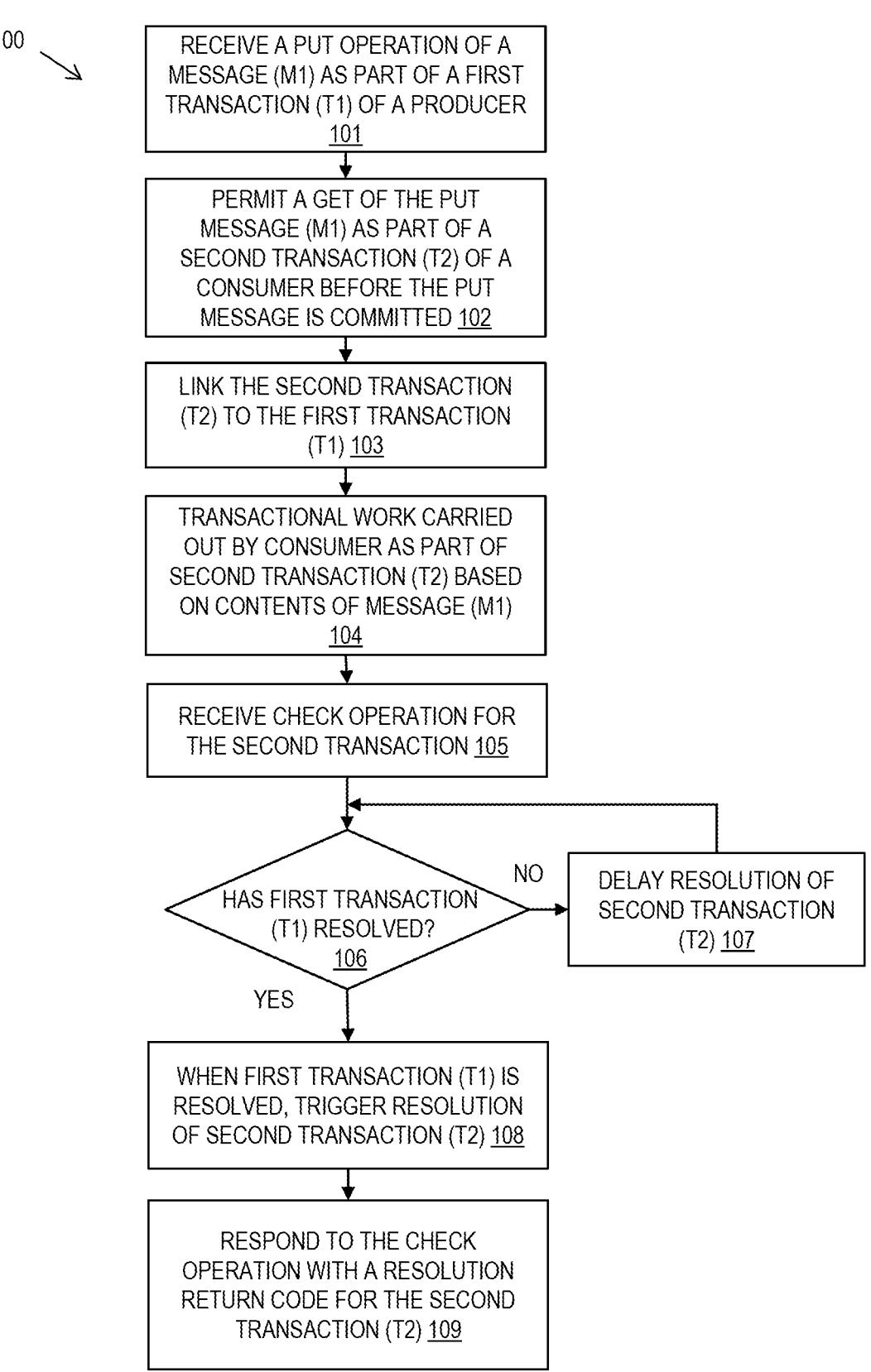
FIG. 1 is a flow diagram of an example embodiment of an aspect of a method in accordance with embodiments of the present invention.

Referring to FIG. 1, a flow diagram 100 shows an example embodiment of the described method for implementing message access for uncommitted transaction messages. The method may be implemented by a transaction manager.

The method may receive 101 a put operation of a message as part of a first transaction. The put operation may be received 101 from a message producer such as a producing application or service. The first transaction may include multiple put messages, for example, as a batch of messages.

The method may permit 102 a get operation as part of a second transaction of the put message before the put message is committed. The get operation may be carried out by a message consumer such as a consuming application or service.

The method may link 103 the second transaction to the first transaction. Transactional work may be carried out 104 by the consumer as part of the second transaction based on the contents of the uncommitted message. However, resolution of the second transaction is delayed until the first transaction is resolved.

The method receives 105 a check operation for the second transaction that all the uncommitted put operations that have been accessed in the second transaction are committed before the second transaction can commit. The check operation may be receiving a commit request operation for the second transaction and holding the commit request operation until first transaction is resolved.

The method may determine 106 if the first transaction has resolved. If it has not yest resolved, the resolution of the second transaction is delayed 107. When the first transaction has resolved, the method may trigger 108 a resolution of the second transaction.

The method may respond 109 to the check operation for the second transaction with a resolution return code. Where the check operation is a commit request operation for the second transaction, the response may be to return a commit request response.

The put operation and get operations may be carried out by an additional application in the middle of a producer application and a consumer application which is responsible for transfer of the message data from one queue to another. For example, this may be for batch transfer of message data over a network. The additional application acts as a producer and consumer with respect to carrying out put and get operations.

Figure 2:
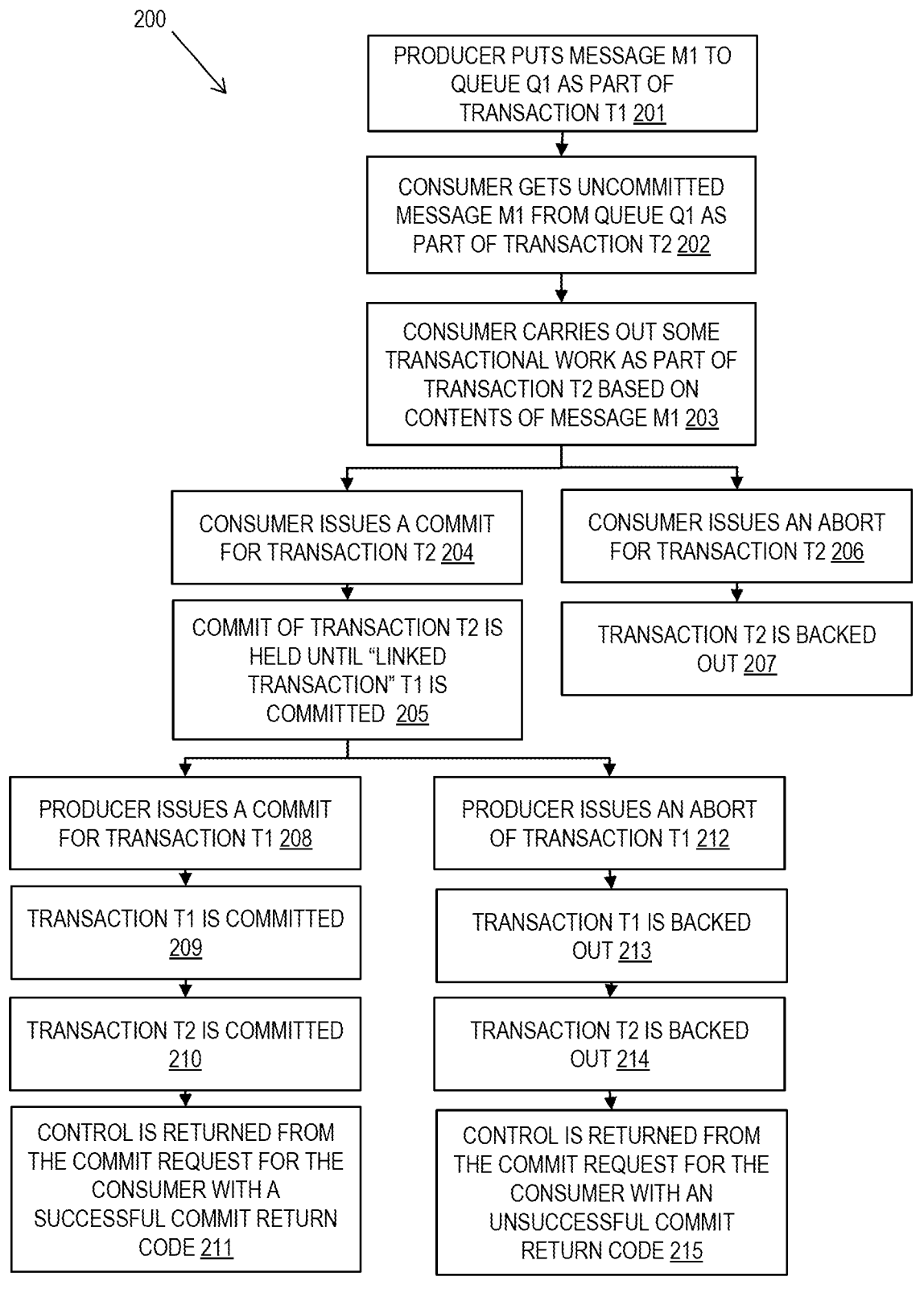
FIG. 2 is a flow diagram of an example embodiment of another aspect of a method in accordance with embodiments of the present invention.

Referring to FIG. 2, a flow diagram 200 shows a further example embodiment of the described method.

The consuming application 330 is able to immediately carry on processing 333 based on the contents of the message 321. When the consuming application 330 decides it wants to commit 334, then it is suspended 335 by the transaction manager until the put 311 of the "pre-emptively got" message 321 is committed 312 by the producing application 310 as a committed message 322. When the producing application 310 commits 312 then the consuming application's 330 commit proceeds 336 and control is returned 337 to the consuming application after the commit as usual.

In a first branch, the consumer may issue a commit 204 for the second transaction T2 and the commit of the second transaction T2 may be held 205 until the linked transaction T1 is committed. In the second branch, the consumer may issue an abort 206 of the second transaction T2 and the second transaction T2 may be backed out 207 ending the method.

In the event of the first branch, there may be two further branches depending on the producer action. In a first further branch, the producer may issue a commit 208 for the first transaction T1 and the first transaction T1 may be committed 209. The second transaction T2 may then be committed 210 as it is linked to the first transaction T1. Control is returned 211 from the commit request for the consumer with a successful commit return code.

In a second further branch, the producer may issue an abort 212 of the first transaction T1 and the first transaction T1 is backed out 213. The second transaction T2 may then be backed out 214 as it is linked to the first transaction T1. Control is returned 215 from the commit request for the consumer with an unsuccessful commit return code.

It may be possible to achieve a similar throughput by an external transaction manager coordinating all parts of the process within a single transaction scope. However, the described method has the advantage that it is less disruptive in the event of a rollback later in the processing. In such a rollback case, only the failing portion and downstream processing needs to be backed out. All upstream processing is still able to commit.

Figure 3:
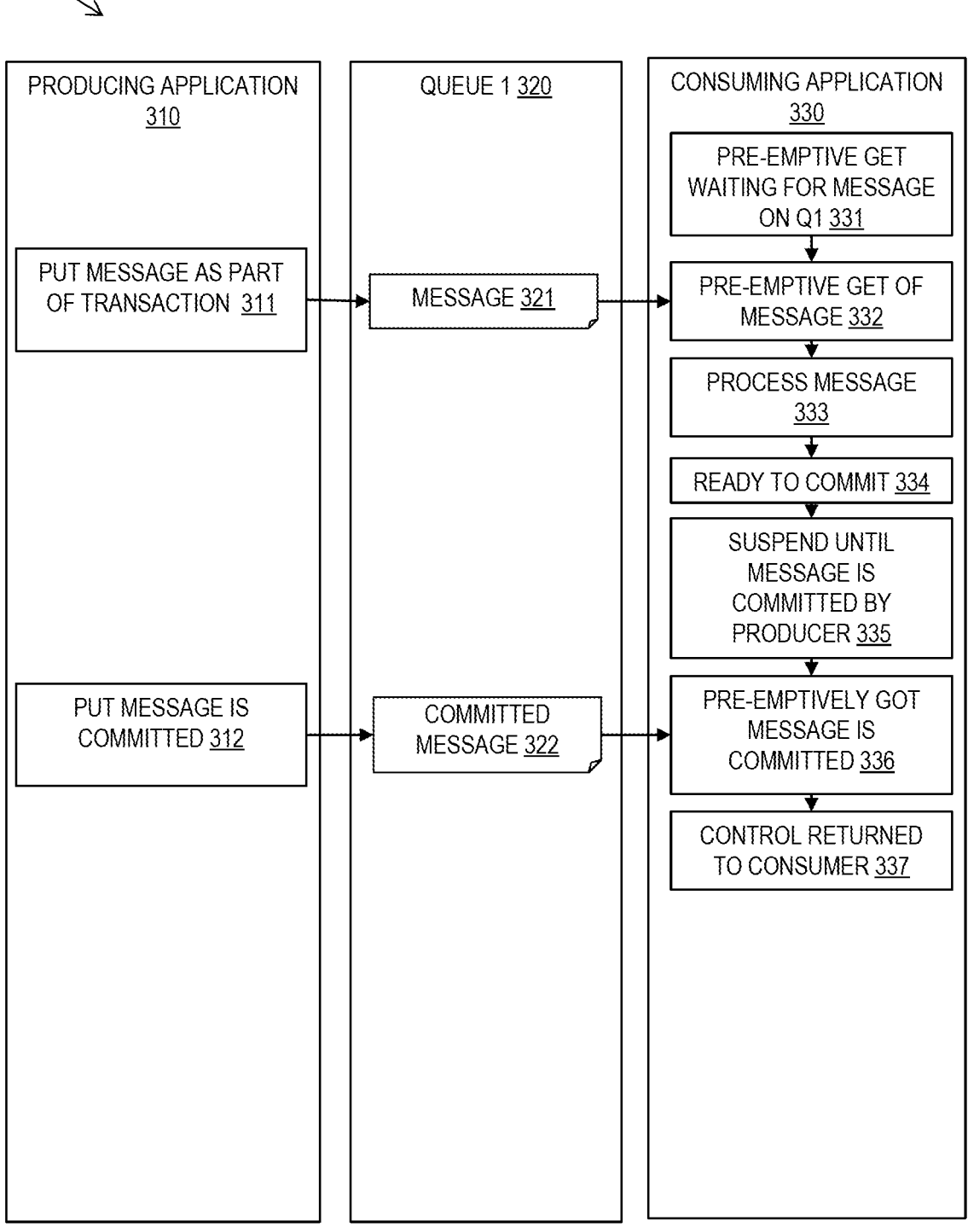
FIG. 3 is a swim-lane flow diagram of an example embodiment of the aspect of the method of FIG. 2.

FIG. 3 shows a swim-lane flow diagram 300 of an example embodiment with message processing by a producing application 310 and a consuming application 330 via a queue 320. The method may start from a state where there are no messages on the queue 320 and both the producing and consuming application are ready to start sending/receiving messages.

The producing application 310 starts by putting 311 a message 321 to the queue 320 as part of a transaction. The consuming application 330 is waiting for a message to arrive on the queue 320 using a "pre-emptive get" 331 and so is able to get 332 the message 321 immediately after the message 321 has been put 311 on the queue 320, even though the message 320 put has not yet been committed.

The consumer application 330 is able to immediately carry on processing 333 based on the contents of the message 321. When the consumer application 330 decides it wants to commit 334, then it is suspended 335 by the transaction manager until the put 311 of the "pre-emptively got" message 321 is committed 312 by the producing application 310 as a committed message 322. When the producing application 310 commits 312 then the consumer application's 330 commit proceeds 336 and control is returned 337 to the consuming application after the commit as usual.

A "pre-emptive get" may be an optional function when getting a message from a queue. The disadvantage of using it would be that if the message producer decided to backout the put, then the consumer also has to backout. This requires more transactional recovery processing than if the consumer was not able to get the uncommitted message in the first place as the consumer would not have ever done any follow on transactional work.

Figure 4A:
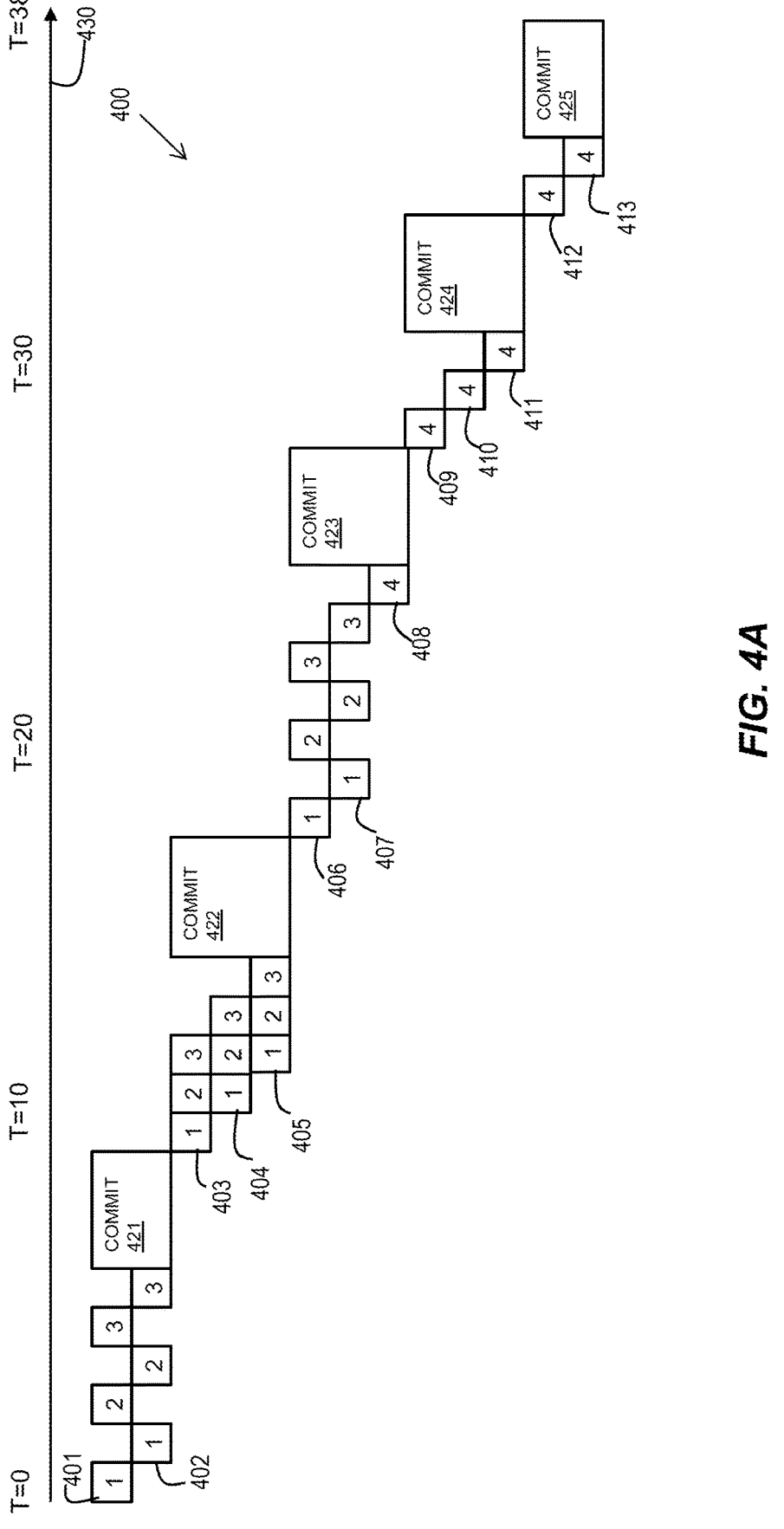
FIG. 4A is a schematic diagram of an example process using the prior art method.

FIG. 4A shows a schematic diagram 400 of an overview of prior art request-reply processing between a producer and consumer with an additional application in the middle which is responsible for batch transfer of the message data from one queue to another. This is a common messaging pattern where the intermediary application is responsible for sending the messages over a network (e.g. a message broker channel process).

The request-reply processing includes the following steps with each step represented by a row in the figure with a time line 430 shown.

App1 external work carries out three operations 1, 2, 3, 401.
App1 puts to Q1 402.
The transaction commits 421.
Channel gets from Q1 403.
Network transfer 404.
Channel put to Q3 405.
The transaction commits 422.
App2 gets from Q2 406.
App2 external work 407.
App2 puts to Q3 as operation 4 408.
The transaction commits 423.
Channel gets from Q3 409.
Network transfer 410.
Channel puts to Q4 411.
The transaction commits 424.
App 1 gets from Q4 412.
App1 external work 413.
The transaction commits 425.

As the processing of a get is delayed until the put messages has committed, this extends the time taken for the overall processing.

Figure 4B:
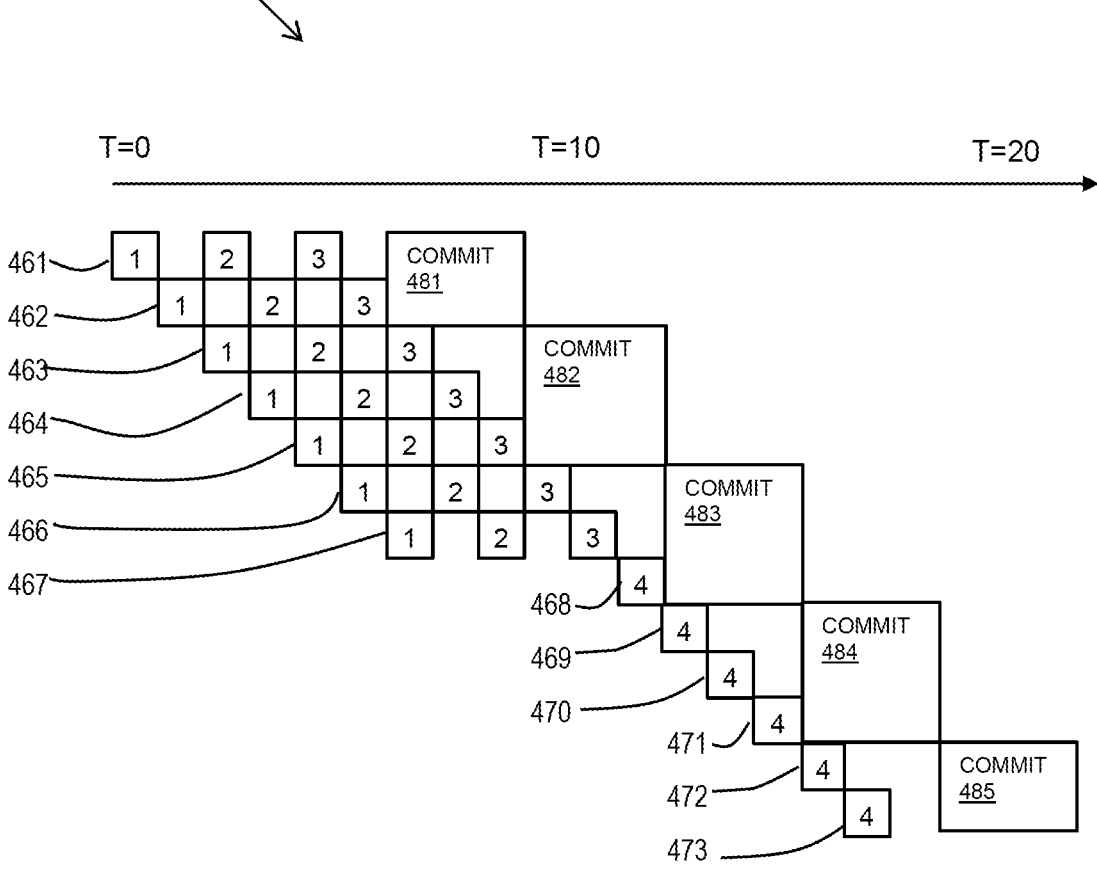
FIG. 4B is a schematic diagram of the example process of FIG. 4A using the current method.

FIG. 4B is a schematic diagram 450 that shows the same request-reply processing 461-473 as the steps 401-413 of FIG. 4A but where the consuming processes use "pre-emptive gets" of the messages. This reduces the time where consuming processes are waiting for uncommitted messages to become available following the batch commits 481-485 and results in an overall higher throughput of messages.

Figure 5:
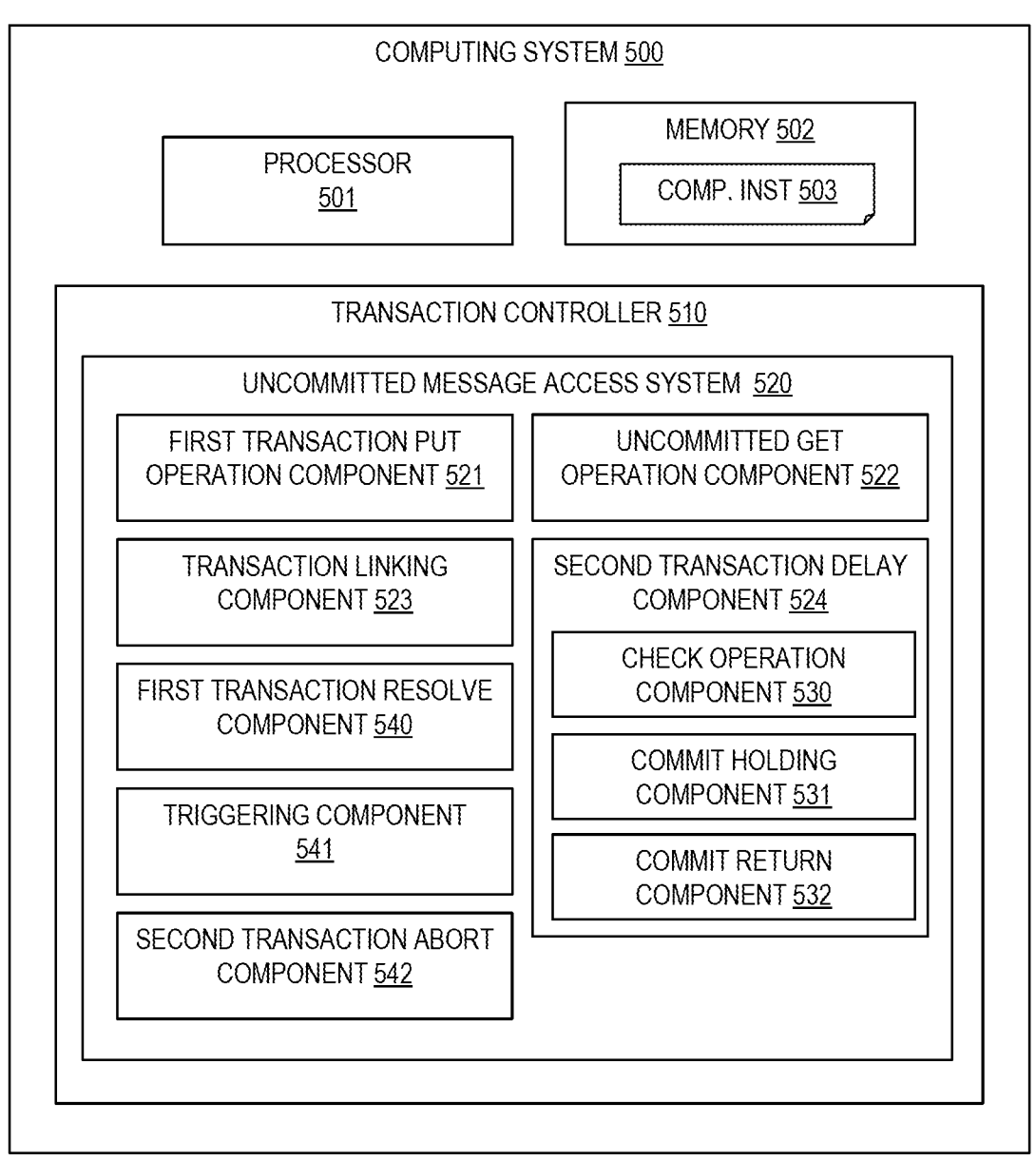
FIG. 5 is a block diagram of an example embodiment of a system in accordance with embodiments of the present invention.

Referring to FIG. 5, a block diagram shows a computing system 500 at which aspects of the described system may be implemented. The computing system 500 includes at least one processor 501, a hardware module, or a circuit for executing the functions of the described components which may be software units executing on the at least one processor. Multiple processors running parallel processing threads may be provided enabling parallel processing of some or all of the functions of the components. Memory 502 may be configured to provide computer instructions 503 to the at least one processor 501 to carry out the functionality of the components.

A transaction controller 510 may be implemented at a computing system 500 and may include an uncommitted message access system 520 having the following components. The components may be provided by operation commands and associated functionality.

The uncommitted message access system 520 includes a first transaction put operation component 521 for receiving a put operation of a message as part of a first transaction and an uncommitted get operation component 522 for permitting a get operation of the put message before the put message is committed, where the get operation is part of a second transaction. The first transaction put operation component 521 may receive a put operation on a queue by a producer, and the uncommitted get operation component 522 may permits a get operation from the queue by a consumer.

The uncommitted message access system 520 includes a transaction linking component 523 for linking the second transaction to the first transaction and a second transaction delay component 524 for delaying resolution of the second transaction until the first transaction is resolved.

The second transaction delay component 524 may include a check operation component 530 for receiving a check operation for the second transaction that all uncommitted put operations are committed before the second transaction can commit and responding to the check operation when the first transaction resolves.

The check operation component 530 includes receiving a commit request operation for the second transaction and the second transaction delay component 524 may include a commit holding component 531 for holding the commit request operation until first transaction is resolved.

The second transaction delay component 524 may include a commit return component 532 for returning control from a waiting commit request operation for the second transaction when the first transaction is resolved.

The uncommitted message access system 520 may include a first transaction resolve component 540 for receiving resolution of a first transaction and a triggering component 541 for triggering resolution of a second linked transaction.

The first transaction resolve component 540 may receive a commit operation for the first transaction and the triggering component 541 may trigger a commit operation of the linked second transaction.

The first transaction resolve component 540 may receive an abort operation for the first transaction and the triggering component 541 may trigger a backout operation of the linked second transaction.

The uncommitted message access system 520 may include a second transaction abort component 542 for issuing an abort for second transaction and backing out the second transaction.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring to FIG. 6, computing environment 600 contains an example of an environment for the execution of at least some of the computer code involved in performing the inventive methods, such as uncommitted message access system code 650. In addition to block 650, computing environment 600 includes, for example, computer 601, wide area network (WAN) 602, end user device (EUD) 603, remote server 604, public cloud 605, and private cloud 606. In this embodiment, computer 601 includes processor set 610 (including processing circuitry 620 and cache 621), communication fabric 611, volatile memory 612, persistent storage 613 (including operating system 622 and block 650, as identified above), peripheral device set 614 (including user interface (UI) device set 623, storage 624, and Internet of Things (IoT) sensor set 625), and network module 615. Remote server 604 includes remote database 630. Public cloud 605 includes gateway 640, cloud orchestration module 641, host physical machine set 642, virtual machine set 643, and container set 644.

COMPUTER 601 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 630. As is well understood in the art of computer technology, and depending upon the technology, performance of a computer-implemented method may be distributed among multiple computers and/or between multiple locations. On the other hand, in this presentation of computing environment 600, detailed discussion is focused on a single computer, specifically computer 601, to keep the presentation as simple as possible. Computer 601 may be located in a cloud, even though it is not shown in a cloud in FIG. 6. On the other hand, computer 601 is not required to be in a cloud except to any extent as may be affirmatively indicated.

PROCESSOR SET 610 includes one, or more, computer processors of any type now known or to be developed in the future. Processing circuitry 620 may be distributed over multiple packages, for example, multiple, coordinated integrated circuit chips. Processing circuitry 620 may implement multiple processor threads and/or multiple processor cores. Cache 621 is memory that is located in the processor chip package(s) and is typically used for data or code that should be available for rapid access by the threads or cores running on processor set 610. Cache memories are typically organized into multiple levels depending upon relative proximity to the processing circuitry. Alternatively, some, or all, of the cache for the processor set may be located "off chip." In some computing environments, processor set 610 may be designed for working with qubits and performing quantum computing.

Computer readable program instructions are typically loaded onto computer 601 to cause a series of operational steps to be performed by processor set 610 of computer 601 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 621 and the other storage media discussed below. The program instructions, and associated data, are accessed by processor set 610 to control and direct performance of the inventive methods. In computing environment 600, at least some of the instructions for performing the inventive methods may be stored in block 650 in persistent storage 613.

COMMUNICATION FABRIC 611 is the signal conduction path that allows the various components of computer 601 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 612 is any type of volatile memory now known or to be developed in the future. Examples include dynamic type random access memory (RAM) or static type RAM. Typically, volatile memory 612 is characterized by random access, but this is not required unless affirmatively indicated. In computer 601, the volatile memory 612 is located in a single package and is internal to computer 601, but, alternatively or additionally, the volatile memory may be distributed over multiple packages and/or located externally with respect to computer 601.

PERSISTENT STORAGE 613 is any form of non-volatile storage for computers that is now known or to be developed in the future. The non-volatility of this storage means that the stored data is maintained regardless of whether power is being supplied to computer 601 and/or directly to persistent storage 613. Persistent storage 613 may be a read only memory (ROM), but typically at least a portion of the persistent storage allows writing of data, deletion of data and re-writing of data. Some familiar forms of persistent storage include magnetic disks and solid state storage devices. Operating system 622 may take several forms, such as various known proprietary operating systems or open source Portable Operating System Interface-type operating systems that employ a kernel. The code included in block 650 typically includes at least some of the computer code involved in performing the inventive methods.

PERIPHERAL DEVICE SET 614 includes the set of peripheral devices of computer 601. Data communication connections between the peripheral devices and the other components of computer 601 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 623 may include components such as a display screen, speaker, microphone, wearable devices (such as goggles and smart watches), keyboard, mouse, printer, touchpad, game controllers, and haptic devices. Storage 624 is external storage, such as an external hard drive, or insertable storage, such as an SD card. Storage 624 may be persistent and/or volatile. In some embodiments, storage 624 may take the form of a quantum computing storage device for storing data in the form of qubits. In embodiments where computer 601 is required to have a large amount of storage (for example, where computer 601 locally stores and manages a large database) then this storage may be provided by peripheral storage devices designed for storing very large amounts of data, such as a storage area network (SAN) that is shared by multiple, geographically distributed computers. IoT sensor set 625 is made up of sensors that can be used in Internet of Things applications. For example, one sensor may be a thermometer and another sensor may be a motion detector.

NETWORK MODULE 615 is the collection of computer software, hardware, and firmware that allows computer 601 to communicate with other computers through WAN 602. Network module 615 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 615 are performed on the same physical hardware device. In other embodiments (for example, embodiments that utilize software-defined networking (SDN)), the control functions and the forwarding functions of network module 615 are performed on physically separate devices, such that the control functions manage several different network hardware devices. Computer readable program instructions for performing the inventive methods can typically be downloaded to computer 601 from an external computer or external storage device through a network adapter card or network interface included in network module 615.

WAN 602 is any wide area network (for example, the internet) capable of communicating computer data over non-local distances by any technology for communicating computer data, now known or to be developed in the future. In some embodiments, the WAN 602 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 603 is any computer system that is used and controlled by an end user (for example, a customer of an enterprise that operates computer 601), and may take any of the forms discussed above in connection with computer 601. EUD 603 typically receives helpful and useful data from the operations of computer 601. For example, in a hypothetical case where computer 601 is designed to provide a recommendation to an end user, this recommendation would typically be communicated from network module 615 of computer 601 through WAN 602 to EUD 603. In this way, EUD 603 can display, or otherwise present, the recommendation to an end user. In some embodiments, EUD 603 may be a client device, such as thin client, heavy client, mainframe computer, desktop computer and so on.

REMOTE SERVER 604 is any computer system that serves at least some data and/or functionality to computer 601. Remote server 604 may be controlled and used by the same entity that operates computer 601. Remote server 604 represents the machine(s) that collect and store helpful and useful data for use by other computers, such as computer 601. For example, in a hypothetical case where computer 601 is designed and programmed to provide a recommendation based on historical data, then this historical data may be provided to computer 601 from remote database 630 of remote server 604.

PUBLIC CLOUD 605 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 605 is performed by the computer hardware and/or software of cloud orchestration module 641. The computing resources provided by public cloud 605 are typically implemented by virtual computing environments that run on various computers making up the computers of host physical machine set 642, which is the universe of physical computers in and/or available to public cloud 605. The virtual computing environments (VCEs) typically take the form of virtual machines from virtual machine set 643 and/or containers from container set 644. It is understood that these VCEs may be stored as images and may be transferred among and between the various physical machine hosts, either as images or after instantiation of the VCE. Cloud orchestration module 641 manages the transfer and storage of images, deploys new instantiations of VCEs and manages active instantiations of VCE deployments. Gateway 640 is the collection of computer software, hardware, and firmware that allows public cloud 605 to communicate through WAN 602.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 606 is similar to public cloud 605, except that the computing resources are only available for use by a single enterprise. While private cloud 606 is depicted as being in communication with WAN 602, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 605 and private cloud 606 are both part of a larger hybrid cloud.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

What is claimed is:

1. A computer-implemented method for implementing message access for uncommitted transaction messages, said method comprising:

receiving a put operation of a message as part of a first transaction;

permitting a pre-emptive get operation of the put message before the put message is committed, wherein the pre-emptive get operation is part of a second transaction;

linking the second transaction to the first transaction; and delaying resolution of the second transaction until the first transaction is resolved by receiving a check operation for the second transaction that all uncommitted put operations are committed before the second transaction can commit and responding to the check operation when the first transaction resolves.

2. The method of claim 1, wherein receiving a check operation includes receiving a commit request operation for the second transaction and holding the commit request operation until first transaction is resolved.

3. The method of claim 1, including:

receiving resolution of a first transaction and triggering resolution of a second linked transaction.

4. The method of claim 3, wherein receiving resolution of the first transaction and triggering resolution of the second transaction includes:

receiving a commit operation for the first transaction and triggering a commit operation of the linked second transaction.

5. The method of claim 4, including:

returning control from a waiting commit request operation for the second transaction with a commit return code.

6. The method of claim 3, wherein receiving resolution of the first transaction and triggering resolution of the second transaction includes:

receiving an abort operation for the first transaction and triggering a backout operation of the linked second transaction.

7. The method of claim 6, including:

returning control from a waiting commit request operation for the second transaction with an unsuccessful commit return code.

8. The method of claim 1, wherein receiving a put operation receives a put operation on a queue by a producer, and permitting a pre-emptive get operation permits a get operation from the queue by a consumer.

9. The method of claim 1, including:

issuing an abort for the second transaction and backing out the second transaction.

10. A system for implementing message access for uncommitted transaction messages, comprising:

a processor and a memory configured to provide computer program instructions to the processor to execute the function of the components of a transaction controller including:

a first transaction put operation component for receiving a put operation of a message as part of a first transaction;

an uncommitted pre-emptive get operation component for permitting a get operation of the put message before the put message is committed, wherein the get operation is part of a second transaction;

a transaction linking component for linking the second transaction to the first transaction; and a second transaction delay component for delaying resolution of the second transaction until the first transaction is resolved by receiving a check operation for the second transaction that all uncommitted put operations are committed before the second transaction can commit and responding to the check operation when the first transaction resolves.

11. The system of claim 10, wherein the check operation component includes receiving a commit request operation for the second transaction and includes a commit holding component for holding the commit request operation until first transaction is resolved.

12. The system of claim 11, wherein the second transaction delay component includes:

a commit return component for returning control from a waiting commit request operation for the second transaction when the first transaction is resolved.

13. The system of claim 10, wherein the function of the components of the transaction controller further includes:

a first transaction resolve component for receiving resolution of a first transaction and a triggering component for triggering resolution of a second linked transaction.

14. The system of claim 13, wherein the first transaction resolve component is for receiving a commit operation for the first transaction and the triggering component is for triggering a commit operation of the linked second transaction.

15. The system of claim 13, wherein the first transaction resolve component is for receiving an abort operation for the first transaction and the triggering component is for triggering a backout operation of the linked second transaction.

16. The system of claim 10, wherein the first transaction put operation component is for receiving a put operation on a queue by a producer, and the uncommitted pre-emptive get operation component permits a get operation from the queue by a consumer.

17. The system of claim 10, wherein the function of the components of the transaction controller further includes:

a second transaction abort component for issuing an abort for the second transaction and backing out the second transaction.

18. A computer program stored on a computer readable storage medium and loadable into the internal memory of a digital computer, comprising software code portions, when said program is run on a computer, for performing a method comprising:

a first transaction put operation component for receiving a put operation of a message as part of a first transaction;

an uncommitted pre-emptive get operation component for permitting a get operation of the put message before the put message is committed, wherein the get operation is part of a second transaction;

a transaction linking component for linking the second transaction to the first transaction; and a second transaction delay component for delaying resolution of the second transaction until the first transaction is resolved by receiving a check operation for the second transaction that all uncommitted put operations are committed before the second transaction can commit and responding to the check operation when the first transaction resolves.

* * * * *